United States Patent Office.

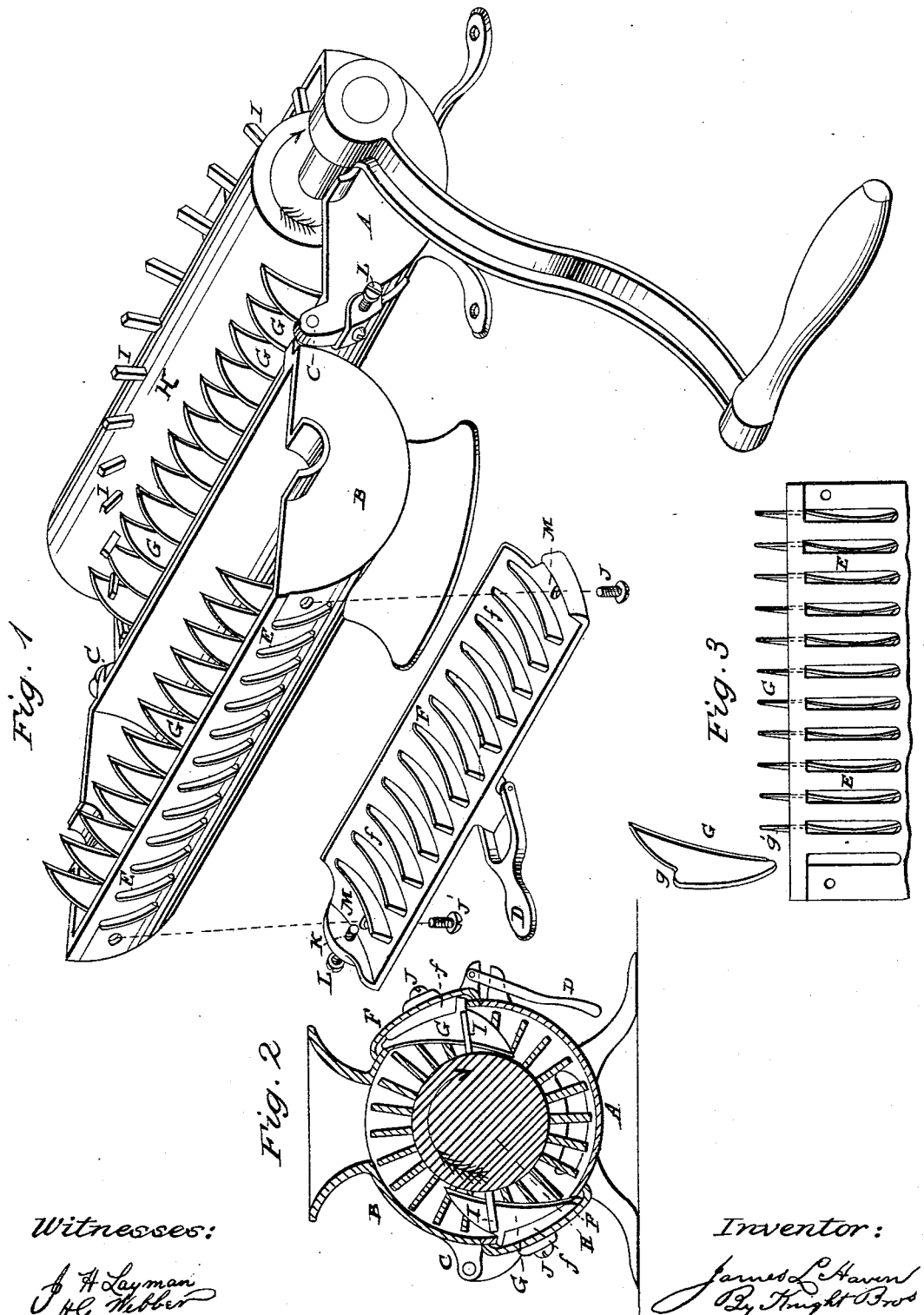

JAMES L. HAVEN, OF CINCINNATI, OHIO.

Letters Patent No. 61,424, dated January 22, 1867.

---

IMPROVED MEAT-CUTTER.

---

*The Schedule referred to in these Letters Patent and making part of the same.*

---

TO WHOM IT MAY CONCERN:

Be it known that I, JAMES L. HAVEN, of Cincinnati, Hamilton county, Ohio, have invented a new and useful Improvement in Meat-Cutters; and I hereby declare the following to be a full, clear, and exact description thereof, reference being had to the accompanying drawings, making part of this specification.

This invention is designed for the class of mincing machines in which the meat is cut up or minced by the action of a series of teeth, which, revolving within a cylindrical case, impel the meat against one or more series of knives; and my improvement consists in a device whereby the entire knives of a series may be accurately and securely fastened in a few seconds and as quickly released, thus enabling them to be cleansed or sharpened as often as may be necessary.

Figure 1 is a perspective view of my machine in its open condition, and with one cap removed.

Figure 2 is a transverse section of the closed machine at the centre of the hopper.

Figure 3 is a side view of a portion of the case.

The external portion or case, A B, consists of two semi-cylindrical shells, of which the upper shell B is connected to the lower shell A by means of a hinge, C, on one side, and a catch, D, on the other side. Each shell has a series of slots, E, which, in conjunction with the ribbed cap, F, serve to hold the knives, G, in place.

The knives G are, as nearly as practicable, precise counterparts of each other, and have each one an upper shoulder, $g$, and a lower shoulder, $g'$, which, when the knives are dropped into their places, serve to bring and hold the said knives accurately to their proper bearings, with their incisive points and edges precisely in line, the said points nearly touching the barrel H of the feeder, which barrel is armed with one or more series of teeth, I, arranged spirally upon its periphery. The ribs $f$, of the cap F, are so formed and spaced as for each one to enter its appropriate slot in the case. Screws, J J', traversing slots M in the cap, serve to secure the latter to the case. A lug, K, projecting from one end of the cap, is tapped to receive a set-screw, L, whose point, being brought to bear against the end of the case, presses all the ribs simultaneously against the sides of the knives, and confines the entire series securely within their respective slots, at the same time causing them to assume a precisely parallel and equidistant position. To compensate for any disparities of thickness and distance in the slots, ribs, and knives respectively, I have found it preferable to slightly spring or bow the knives, as shown in fig. 3, so that although differing slightly in relative thicknesses, they shall be capable of being firmly gripped between their respective ribs and slots. It will be perceived that the tightening of a single set-screw is made available to secure all of the knives of one series simultaneously in their places, and the relaxing of the same screw acts to release all of the knives at once, so that they can be taken out for sharpening or renewal, I do not propose to restrict myself to the precise form here selected for illustration, the same being obviously susceptible of various modifications; for example, the set-screw L may be dispensed with by making the ribs and knives of just sufficient thickness to snugly fill the slots in the case when the cap is brought home by the side screws J J; or an incline or wedge could be cast on the case or cap, which would either draw or push the cap endwise, by screwing home the side screws, thereby in either case dispensing with the end screws entirely.

I claim herein as new, and of my invention—

1. The mode of securing an entire series of meat-cutting or mincing knives G, by means of a single set-screw L, ribbed plate F, and slotted case A B, substantially as set forth.

2. The provision of ribs $f$, on the side of a meat-cutter, whether cast on the case or separately, in combination with a correspondingly ribbed loose part, when arranged so that one lateral movement will firmly hold all the knives substantially as set forth.

3. The mode of securing a series of meat-cutting or mincing knives G, by means of the lateral movement of a ribbed plate F, against corresponding ribs on the slotted case A B, substantially as set forth.

In testimony of which invention I hereunto set my hand.

JAMES L. HAVEN.

Witnesses:
GEO. H. KNIGHT,
JAMES H. LAYMAN.